3,018,203
SOLID PROPELLANT AND A PROCESS FOR ITS PREPARATION

Eugene D. Guth, Idaho Falls, Idaho, assignor to Phillips Petroleum Company, a corporation of Delaware
No Drawing. Filed Mar. 31, 1958, Ser. No. 725,453
13 Claims. (Cl. 149—19)

This invention relates to an improved solid propellant and to a method for preparing such propellant. In one aspect this invention relates to solid propellants which are particularly adapted to the case bonding method of preparation. In another of its aspects this invention relates to a method for preparing a solid propellant whereby the composition is mobile prior to curing so that molding of the charge is greatly facilitated.

In the production of solid propellants, particularly when the composition is to be fabricated into a large grain, the mixing and molding steps often require the expenditure of a large amount of work on these materials because of the high concentration of solids in such compositions and the necessity for achieving intimate admixture of the ingredients.

It is, therefore, an object of this invention to provide solid rocket fuel compositions which are mobile prior to curing such compositions. It is also an object of this invention to provide a rocket fuel composition wherein substantially all of the ingredients supply gaseous combustion products for propulsion of the rocket. It is a further object of this invention to provide a rocket fuel composition wherein the binder material is a liquid prior to curing of the rocket fuel grain. Other objects and advantages will be apparent to one skilled in the art upon study of this disclosure of the invention.

Broadly, the invention comprises a solid rocket fuel composition comprising a solid oxidizer, a binder comprising liquid polybutadiene and a ferric salt such as ferric nitrate hydrate, ferric chloride hydrate or ferric sulfate hydrate. A reinforcing agent and buring rate catalyst can be included in the formulation if desired. I have discovered that liquid polybutadiene can be utilized as the fuel and binder portion of a solid propellant composition by incorporating in the polybutadiene and solid oxidizing salt mixture, a ferric salt such as ferric nitrate so that upon subsequent heating the liquid polybutadiene is cured to a rubbery solid material which acts as the binder for the propellant grain. Reinforcing agents such as carbon black, wood flour, lignin, and various reinforcing resins such as styrene-divinylbenzene, methlacrylate-divinylbenzene, acrylate acid-styrene-divinylbenzene, and methylacrylate-acrylate acid-divinylbenzene resins can also be included in amounts up to equal parts of reinforcing agent and polybutadiene binder or omitted entirely.

Combustion rate catalysts can be incorporated in the propellant charge if desired, such as ammonium dichromate, complex cyanides of metal such as iron, nickel, and copper, iron oxide, and the like. The complex cyanides of iron include the ferrocyanides and ferricyanides known as milori blue, prussian blue, chinese blue and the like. The catalysts can be used in amounts up to about 12 parts by weight per 100 parts by weight of polybutadiene, or can be omitted entirely.

The polybutadiene employed as the fuel and binder portion of my rocket propellant composition can be made by any method, however one preferred method comprises polymerizing 1,3-butadiene in a solvent and in the presence of finely divided sodium metal catalyst at a temperature in the range of about 60 to about 110° C. and at a pressure sufficient to prevent evaporation of the butadiene. The product is recovered by treatment of the reactor effluent with water and carbon dioxide followed by a filtration step and evaporation of the solvent. This process is more fully described in U.S. Patent 2,631,185, issued March 10, 1953, to W. W. Crouch.

The liquid polybutadiene will preferably have a SFV viscosity at 100° F. of 1500 to 10,000 as determined by the ASTM test method D88–53. Polybutadiene of lower viscosity can be employed to prepare solid propellants which are softer than the grains normally used and polybutadiene of higher viscosity can be employed to prepare solid propellant compositions which are harder and display greater tensile strength than the rocket propellant compositions normally used, however, the processing difficulties increase as the viscosity of the polybutadiene increases.

The binder portion of the propellant composition comprises 60 to 85 parts by weight of polybutadiene and 15 to 40 parts by weight of the ferric salt plus any other ingredients employed. Thus, the binder portion of the propellant is from about 13 to about 30 parts by weight of the total. Propellant grains are cured at a temperature of about 150 to 280° F. for a period of time in the range of about 4 hours to about 48 hours.

In the preparation of the solid rocket propellant compositions, the solid inorganic oxidizing salts are powdered to sizes preferably in the range of 300 to 10 microns average particle size. The amount of solid inorganic oxidizing salt employed is usually a major amount of the total composition and is generally in the range of 70 to 87 parts by weight of the total oxidizing salt and binder composition.

Solid inorganic oxidizing salts include ammonium nitrate, ammonium perchlorate, sodium nitrate, and other alkali and alkaline earth metal salts of nitric, perchloric and chloric acids and mixtures thereof. Ammonium nitrate and ammonium perchlorate are preferred.

The various ingredients of the propellant composition can be mixed on a roll mill or an internal mixer such as a Banbury or a Baker-Perkins dispersion blade mixer. The propellant can be formed in a mold or directly in the rocket case. It is preferred to coat the mold or rocket case with a thermoplastic liner such as rubber and then cast the propellant in the lined vessel by pouring or pressing the propellant into the mold or rocket case. The mold is evacuated to expel volatile material and pressure is applied to the propellant charge during the curing time.

The following specific embodiment of the invention will aid in an understanding of the invention but is not to be construed as unduly limiting the invention.

*Example*

A solid propellant was prepared having a composition as follows:

| | Parts by weight |
|---|---|
| Ammonium nitrate | 85 |
| Polybutadiene, viscosity 1500 | 10 |
| Ferric nitrate hydrate | 5 |

These materials were blended together and pressed in a mold to give tensile specimens. The specimens were cured for 24 hours at 180° F. Before curing, the material was soft and could be deformed easily. It could be pressed into a desired shape with ease. After curing, the specimens were hard and rigid. The properties of the specimens were as follows:

Tensile strength _____ 315 pounds per square inch.
Elongation _____ 2.5 percent.
Modulus of elasticity ___ 19,700 pounds per square inch.

The burning rate of the catalyst composition is about 0.1 inch per second at 1,000 p.s.i.

Variations and modifications are possible within the scope of this disclosure without departing from the spirit and scope of the invention.

That which is claimed is:

1. A solid propellant composition comprising a major amount of a solid inorganic oxidizing salt and a minor amount of solid polybutadiene wherein the solid polybutadiene is derived from liquid polybutadiene cured in admixture with said oxidizing salt at a temperature in the range of about 150 to 280° F. and in the presence of a sufficient amount of a ferric salt of a strong inorganic acid to solidify said liquid polybutadiene in the said temperature range.

2. A solid propellant composition comprising about 70 to about 87 parts by weight of a solid inorganic oxidizing salt and about 13 to about 30 parts by weight of a binder containing about 60 to 85 parts by weight of solid polybutadiene and about 15 to about 40 parts by weight of a ferric salt of a strong inorganic acid wherein the solid polybutadiene is derived from liquid polybutadiene solidified in the presence of said oxidizing salt and said ferric salt at a temperature in the range of about 150 to about 280° F.

3. The composition of claim 2 wherein the solid inorganic oxidizing salt is ammonium nitrate.

4. The composition of claim 2 wherein the oxidizing salt is ammonium perchlorate.

5. The composition of claim 2 wherein the oxidizing salt is potassium perchlorate.

6. The composition of claim 2 wherein the oxidizing salt is potassium nitrate.

7. The composition of claim 2 wherein the oxidizing salt is sodium nitrate.

8. The method of producing a solid propellant which comprises intimately admixing about 70 to about 87 parts by weight of a solid inorganic oxidizing salt and about 13 to about 30 parts by weight of a binder comprising about 60 to about 85 parts by weight of liquid polybutadiene having a SFV viscosity at 100° F. of about 1,500 to about 10,000 and about 15 to about 40 parts by weight of a ferric salt of a strong inorganic acid and curing the composition at a temperature in the range of about 150 to about 280° F. for a time in the range of about 4 hours to about 48 hours.

9. The composition of claim 2 wherein the ferric salt is ferric nitrate hydrate.

10. The composition of claim 2 wherein the ferric salt is ferric chloride.

11. The composition of claim 2 wherein the ferric salt is ferric sulfate.

12. The method of preparing a propellant composition which comprises intimately admixing a major amount of a solid inorganic oxidizing salt and a minor amount of liquid polybutadiene containing a sufficient amount of a ferric salt of an inorganic acid to cure said liquid polybutadiene to a solid rubbery state; and curing the resulting composition at a temperature in the range of about 150 to 280° F. for a period of time in the range of about 4 hours to about 48 hours.

13. A solid propellant composition consisting essentially of an intimate admixture of about 85 parts by weight of ammonium nitrate, about 10 parts by weight of solid polybutadiene and about 5 parts by weight of ferric nitrate hydrate wherein the solid polybutadiene is derived from liquid polybutadiene cured in admixture with said oxidizing salt and said ferric salt at a temperature in the range of about 150 to about 280° F.

References Cited in the file of this patent

UNITED STATES PATENTS

| | | |
|---|---|---|
| 2,468,027 | Britton et al. | Apr. 26, 1949 |
| 2,826,565 | Crouch et al. | Mar. 11, 1958 |
| 2,855,372 | Jenkins et al. | Oct. 7, 1958 |

FOREIGN PATENTS

| | | |
|---|---|---|
| 655,585 | Great Britain | July 25, 1951 |
| 742,283 | Great Britain | Dec. 21, 1955 |

OTHER REFERENCES

Smith: British Interplanetary Society Journal, vol. 16, No. 17, October, December 1957, pp. 198–211, note p. 201.

Zaehringer: Chem. Engineering Progress, vol. 51, No. 7, July 1955, p. 302.

Blatz: Industrial and Engineering Chemistry, vol. 48, No. 4, April 1956, pp. 727–729.

Deschere: Industrial and Engineering Chemistry, vol. 49, No. 9, September 1957, pp. 1333–1336.

Arendale: Ind. and Eng. Chem., vol 48, No. 4, April 1956, pp. 725–6.

Ritchey: Chem. and Eng. News, Nov. 11, 1957, pp. 78–82.

Chem and Eng. News, Oct 7, 1957, pp. 62–3.

Chem and Eng. News, Jan. 6, 1958, p. 79.

"Jet Propulsion," Air Technical Service Command, 1946, downgraded to unclassified by authority of disposition from form WCLPN–2 of April 23, 1954, p. 158.